(12) United States Patent
Jacobus et al.

(10) Patent No.: US 8,109,544 B2
(45) Date of Patent: Feb. 7, 2012

(54) UNLOCKING DEVICE

(75) Inventors: Heinz Jacobus, Dudweiler (DE);
Alexander Weingardt, Saarbrücken (DE)

(73) Assignee: Hydac Electronics GmbH, Saarbrücken (DE)

( * ) Notice: Subject to any disclaimer, the term of this patent is extended or adjusted under 35 U.S.C. 154(b) by 673 days.

(21) Appl. No.: 12/084,323

(22) PCT Filed: Oct. 24, 2006

(86) PCT No.: PCT/EP2006/010212
§ 371 (c)(1),
(2), (4) Date: Apr. 30, 2008

(87) PCT Pub. No.: WO2007/059835
PCT Pub. Date: May 31, 2007

(65) Prior Publication Data
US 2009/0151403 A1    Jun. 18, 2009

(30) Foreign Application Priority Data
Nov. 24, 2005 (DE) .................. 10 2005 056 816

(51) Int. Cl.
*E05C 3/06* (2006.01)
*E05C 17/56* (2006.01)

(52) U.S. Cl. .............. 292/201; 292/251.5; 292/340
(58) Field of Classification Search ................ 292/201, 292/207, 251.5, 340–341.19, DIG. 61
See application file for complete search history.

(56) References Cited

U.S. PATENT DOCUMENTS

| | | | |
|---|---|---|---|
| 971,423 A * | 9/1910 | Walters | 292/201 |
| 1,199,199 A * | 9/1916 | Mason | 292/201 |
| 2,381,633 A * | 8/1945 | Young | 292/341.17 |
| 3,325,203 A * | 6/1967 | Moler | 292/201 |
| 4,088,354 A * | 5/1978 | Kolendowicz | 292/201 |
| 5,042,857 A * | 8/1991 | Burrows et al. | 292/341.16 |
| 5,176,417 A * | 1/1993 | Bauer | 292/201 |
| 5,263,347 A * | 11/1993 | Allbaugh et al. | 70/257 |
| 6,036,241 A * | 3/2000 | Ostdiek et al. | 292/229 |
| 6,139,073 A * | 10/2000 | Heffner et al. | 292/201 |
| 7,004,517 B2 * | 2/2006 | Vitry et al. | 292/213 |

FOREIGN PATENT DOCUMENTS

| | | |
|---|---|---|
| DE | 198 30 407 A1 | 1/2000 |
| DE | 199 49 944 C1 | 12/2000 |
| DE | 102 15 054 A1 | 10/2003 |
| DE | 10 2004 017 688 A1 | 11/2005 |
| WO | WO 99/61730 | 12/1999 |
| WO | WO 01/87666 A1 | 11/2001 |
| WO | WO 2004/056606 A1 | 7/2004 |

* cited by examiner

*Primary Examiner* — Carlos Lugo
(74) *Attorney, Agent, or Firm* — Roylance, Abrams, Berdo & Goodman, L.L.P.

(57) ABSTRACT

An unlocking device for actuating a control device in the locked condition to release it. The unlocking device has an actuating magnet guided in a coil base and/or in housing elements (28) of the actuating magnet and has an actuating element that can be displaced and that releases, in an actuation position, an unlocking path for a control unit has a locking element (30). The locking element, when unlocked by the actuating element via the control unit, releases the trajectory for the control device to be actuated. The locking device (30) is guided in the housing element (28) of the actuating magnet and prevents the control device from being unintentionally locked again by maintaining it in the unlocked position by a blocking part (48). The unlocked position corresponds to a release of the control device.

2 Claims, 5 Drawing Sheets

UNLOCKING DEVICE

FIELD OF THE INVENTION

The invention relates to an unlocking device for actuating a control part in the locked state to release it, with an actuating magnet guided in a coil base and/or in housing parts of the actuating magnet. An actuating element can be moved and, in the actuating position, clears an unlocking path for a control unit having a locking part. The locking part, unlocked by the actuating element via the control unit, clears the path of movement for the control part to be actuated.

BACKGROUND OF THE INVENTION

Unlocking devices such as these can be used for a plurality of applications. Especially wherever it is important to execute an initiation process for a technical component in a dedicated and reliable manner, unlocking devices with actuating magnets are preferred. This actuating magnet even in rough, everyday operation, for example, when exposed to vibrations or impacts, is reliable in use, as experience shows. With the unlocking device according to the invention, especially in the motor vehicle domain, safety-relevant parts can be unlocked and caused to operate, whether in the form of a roll bar which is to be deployed or in the form of a headrest which moves forward in a crash, in order to reduce the free impact path between the back of the head of the seat occupant and the head impact surface on the headrest, etc.

In these unlocking devices, the actuating magnet with the actuating element and movable control unit can be housed in a very small installation space. These devices can then be accommodated in a space-saving manner within motor vehicles. As a result of the space-saving structure, these unlocking devices can also be used directly at the site of the initiation process, where previously, in the prior art, optionally Bowden cables which are complex to manage have accomplished the initiation process over greater path distances.

On the other hand, for safety-relevant applications of these unlocking devices, there is, however, the danger of loss of operating reliability. After an initiation process in which the pertinent safety means has been activated by triggering the control part, in many cases it is necessary, in order to ensure operating reliability, to replace the safety means itself or its parts by new parts before reactuation. In other words, there is the risk that an already activated safety means will be inadvertently returned to the initial position, the control part will be returned to the locked state by the unlocking device, and the safety means which is no longer reliable after completed activation is "armed" again.

SUMMARY OF THE INVENTION

An object of the invention is to provide an unlocking device in which the danger of this loss of operating reliability of an assigned safety means is avoided.

According to the invention, this object is basically achieved by an unlocking device having a locking part guided in the housing part of the actuating magnet. A blocking part keeps the locking part in the unlocked position corresponding to the release of the control part to prevent unintentional re-locking of the control part.

In one especially advantageous embodiment, the blocking part is formed by a spring clamp guided with its free spring ends at least partially along the housing part for movement between the blocking position in which the locking part is held by the spring clamp in the unlocked position, and the position in which the locking part is released for re-locking of the control part. The arrangement can preferably be made such that the spring clamp is accessible to manual movement out of the blocking position.

The spring clamp can be shaped such that the free spring ends in the blocking position between themselves form a clamping gap for clamping the locking part in the unlocked position.

In embodiments characterized by a design enabling simple and comfortable handling, oblique guides are on the housing part. When the spring clamp moves out of the blocking position into the position releasing the locking part, the oblique guides form control surfaces for the spring ends. The central surfaces spread the spring ends apart from one another and widen the clamping gap to release the locking part for return into the position locking the control part.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
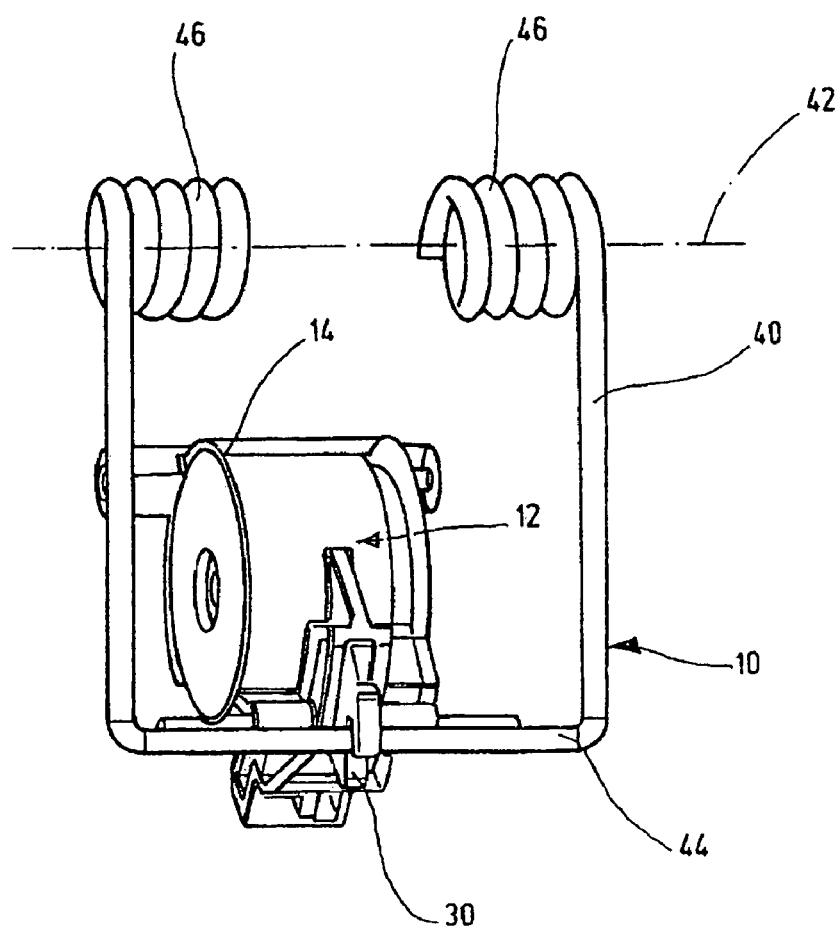
FIG. 1 is a front perspective view and an unlocking device according to an exemplary embodiment of the invention.

The unlocking device for the control part 10, according to the perspective view of FIG. 1 showing its most important components, includes an actuating magnet 12. The actuating magnet 12 has a coil base 14 with a coil winding (not detailed) and in which a cylinder shaped or rod shaped actuating element 16 is guided to be able to move lengthwise.

Figure 2:
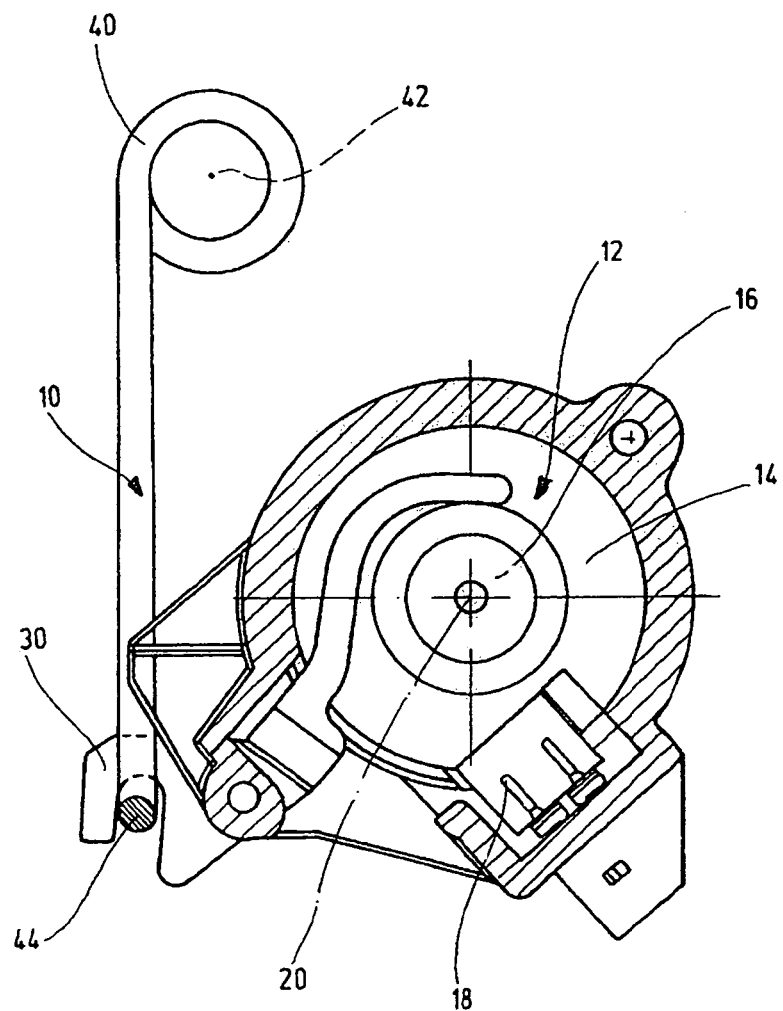
FIG. 2 is a side elevational view in section of the device of FIG. 1 in the locked state.

The actuating magnet 12, made in the manner of a conventional electromagnet, is designed such that when power is supplied to the coil base 14 via a connector 18, the actuating element 16 is pulled to the inside, that is, in the view of FIG. 2, in the direction of the rear plane of the figure. A reset spring (not detailed) can reset the actuating element 16 when the coil base 14 is not energized. The actuating element with a definable projection then protrudes over the front of the coil base 14 including the front of the actuating magnet 12. In this respect the actuating element 16 is therefore arranged to be able to move along a first axis 20.

Figure 3:
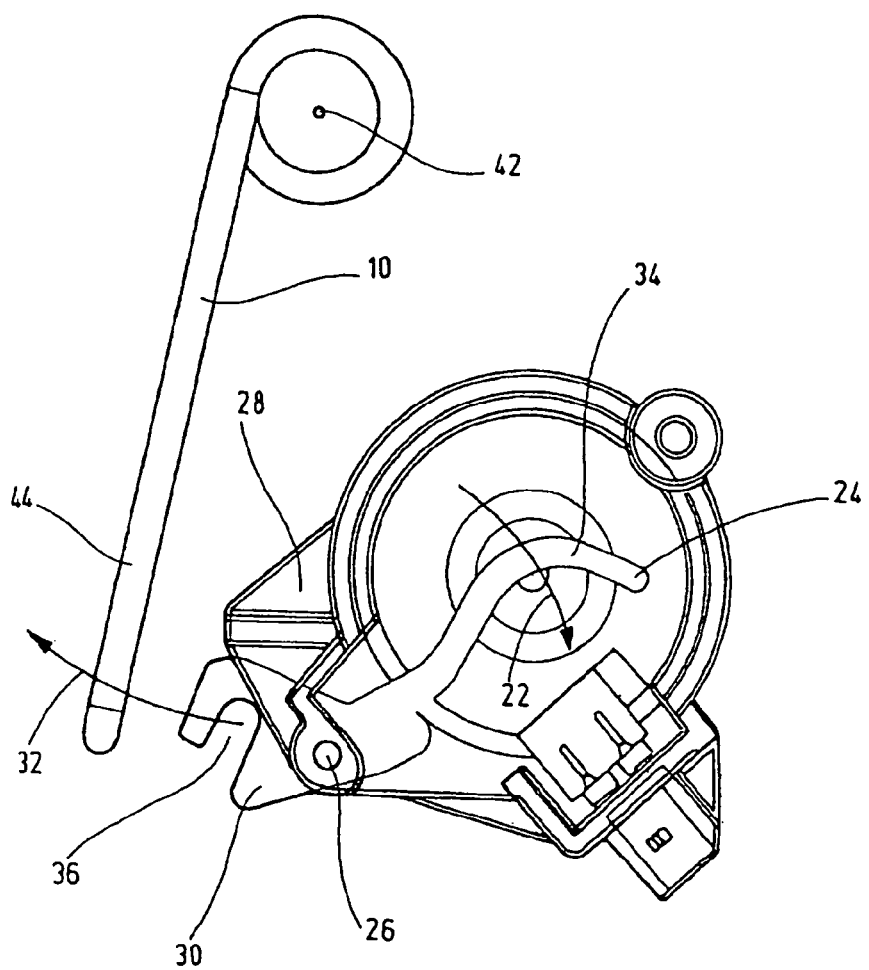
FIG. 3 is a side elevational view in section of the device of FIG. 1 in the unlocked state.

In the actuating position of the unlocking device shown in FIG. 3, the actuating element 16 is pulled to the rear by the actuating magnet 12 and thus clears a swiveling or pivoting path 22 extending transversely to the first axis 20 and shown in FIG. 3 with an arrow. Along this swiveling or pivoting path 22, control unit 24 pivots clockwise around a second axis 26 extending parallel to the first axis 20. This second axis 26 is, for example, made as a pivoting axle or pivoting journal. Its free ends are guided on the end side in the housing part 28, preferably formed from a suitable plastic material. As is further shown in FIGS. 1 to 3, the control unit 24 has a locking part 30. When unlocked by the actuating element 16 by way of the control unit 24, locking part 30 clears the path 32 of movement, shown in FIG. 3 with an arrow, for the control part 10 to be actuated. Inasmuch as FIGS. 1 and 2 relate to the locked position for the control part 10, the locking part 30 at least partially encompasses the control part 10 and in this way holds it in the locked position.

Figure 4:
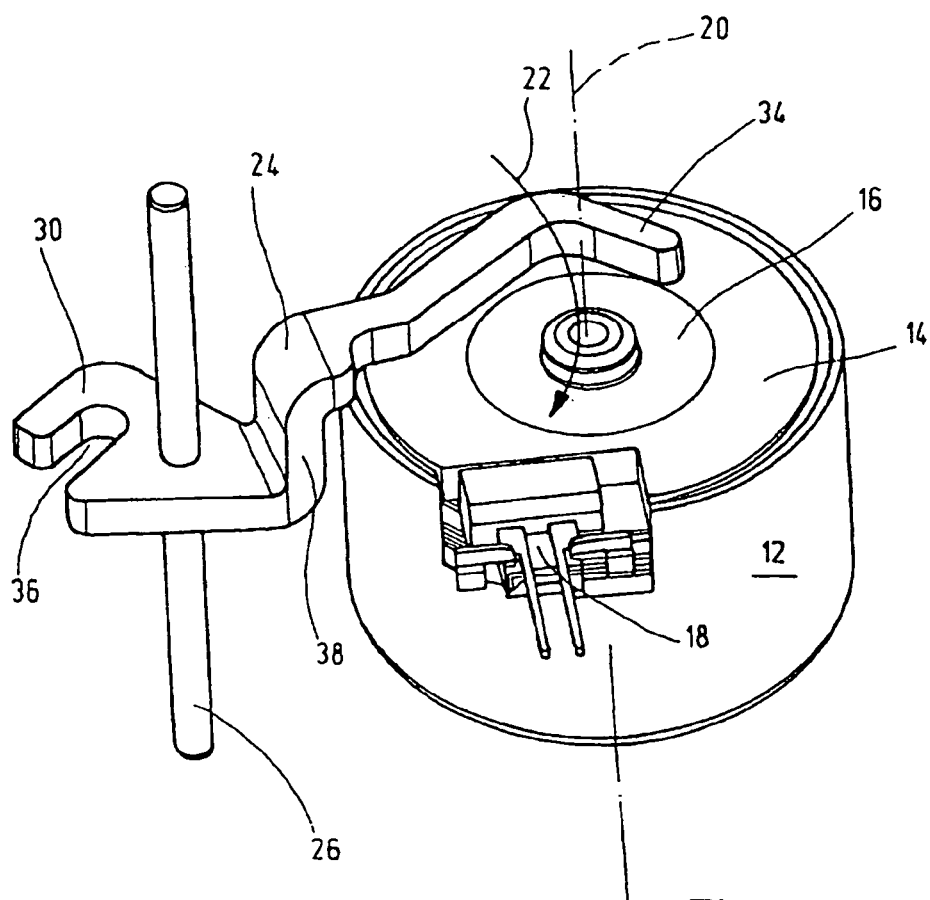
FIG. 4 is a perspective top view of the actuating magnet with a ratchet of the device of FIG. 1.

The control unit 24 has a pivoting lever 34, as shown in FIG. 4. The pivoting lever 34 is guided to be able to pivot around the second axis 26 in the housing part 28 which for the sake of simplicity has been omitted in FIG. 4. The pivoting lever 34 on its one free end in the unactuated state of the actuating magnet 12 is in contact with the actuating element 16. As shown in FIG. 4 the actuating element 16 can be moved into the coil base 14 of the actuating magnet 12 to clear the pivoting path 22 for the pivoting lever 34. Accordingly, in the retracted position of the actuating element 16, actuating element 16 forms with its front essentially a plane front surface with the front of the coil base 14 facing the viewer of FIG. 4.

As shown in FIG. 4, the pivoting lever 34 is still in its unactuated position. On the other end of the pivoting lever 34, the control part 10 is then held in the locking position. The locking part 30 of the control unit 24 is made in the manner of a claw or jaw opening 36. This locking part 30 can be arranged centrally, that is, force-equalized in the middle of the device (cf. FIG. 1). In this respect, the pivoting lever 34 has an axial offset 38 located therein to ensure this center arrangement. For the unlocking process, the claw or jaw opening 36 pivots clockwise around the pivoting axis 26 out of the locked position as shown in FIGS. 1 and 2 into the unlocked position as shown in FIG. 3.

In certain application tasks, a rotary spring or the like can be attached to the second axis 26 to move the pivoting lever along the swiveling path 22 as soon as the actuating element 16 has been pulled into the coil base 14. In this case, however, in the actuated state of the actuating magnet 12, the control part 10 by an energy storage device will cause unlocking for the pivoting lever 34 from the outside which then pivots around the second axis 26 into the unlocked position. For this reason, the control part 10 provides for a spring clamp, preferably in the form of a double spring clamp 40, with an energy storage device in the form of spring energy in the unlocked state enabling pivoting away along the path 32 of movement from the control unit 24 for the control part 10. Specifically, control part 10 pivots around a third axis 42 extending parallel to the first axis 20 and the second axis 26. Based on the inherent dynamics of the control part 10 in the form of the double spring clamp 40, it is therefore sufficient to actuate the actuating magnet 12 to be able to undertake unlocking, controlled from the outside.

The actuating magnet 12 is made in the shape of a cup. In this respect, actuating magnet 12 has an annular coil base 14 with winding ends connected respectively to the connector 18. As the actuating element 16, the coil base 14 encompasses a flat-cylindrical actuating rod. The rod comparably has a cup shape to the annular coil base 14 and is guided to be able to move lengthwise therein. As FIG. 4 furthermore shows, the pivoting lever 34, on its one free end facing the actuating element 16 in the manner of a catch, is provided tapering with a curvature at least partially following the curvature of the outer periphery of the actuating element 16 (cf. also FIG. 2). The double spring clamp 40 with its clamp part 44 in the locking position engages the locking part 30 of the control unit 24. The two round springs 46 relating to the double arrangement encompass the third axis 42 in the middle.

Figure 5:
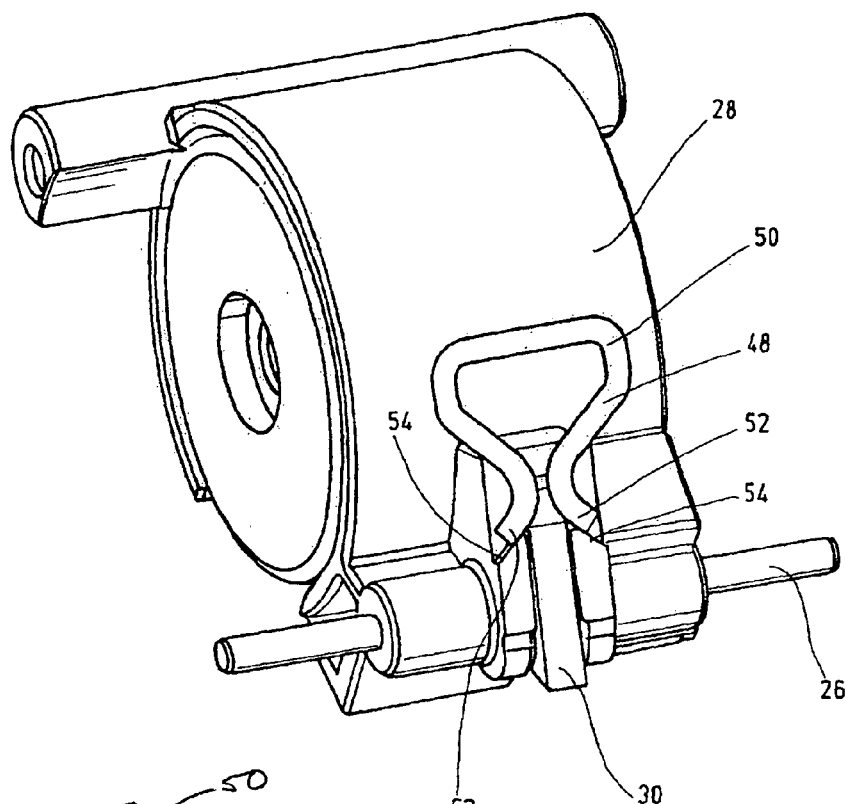
FIG. 5 is a partially cutaway perspective view of the housing of the device of FIG. 1, with the blocking element inserted.

If, as shown in FIG. 3, the control part 10 is pivoted counterclockwise back around the axis 42, the clamp part 44 catches again in the claw or jaw opening 36. The pivoting lever 24 then pivots counterclockwise into its initial position as shown in FIG. 4. If at this point the actuating magnet 12 is no longer energized, the actuating element 16, for example, under the action of a reset spring (not detailed), withdraws until the outside periphery of the actuating element 16 then again adjoins the inside of the pivoting lever 34. By a corresponding reset process, the unlocking device could again be "armed". In the invention this rearming is prevented, for example, because parts of a safety means (not shown) or the safety means itself must be replaced. Therefore, provision is made against the clamp part 44 again unintentionally engaging the locking part 30 and its claw or jaw opening 36 in the corresponding manner. To prevent this engagement, the locking part 30 is held in its unlocking position shown in FIG. 3. The blocking part 48 shown in FIG. 5 prevents unintentional re-locking of the control part 10.

The blocking part 48 includes a spring clamp 50 with free spring ends 52 guided at least partially along the housing part 28 and movable into the position to release the locking part 30. To better illustrate these conditions, in FIG. 5, relative to the front view, part of the wall of the housing part 28 is omitted to illustrate the action of the spring clamp 50 on the top of the locking part 30. In the position shown in FIG. 5, the spring clamp 50 forms the blocking part in its unblocking position. When the unlocking process is actuated, the locking part 30 snaps upward and moves into the clamping gap between the spring ends 52 in the blocking position.

Figure 6:
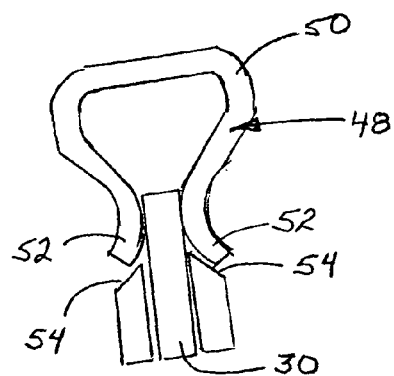
FIG. 6 is a partial perspective view of the blocking element blocking the locking part of the device of FIG. 1.

The spring ends 52 between themselves then clamp a portion of the locking part 30 as shown in FIG. 6 such that it is held in the unlocking position as shown in FIG. 3. If at this point, viewed in the direction of FIG. 5, the spring clamp 50 is pushed down by hand, the free spring ends 52 slide along the oblique guides 54 of the housing part 28 so that the spring ends 52 are spread apart from one another and then clear the swiveling path for the locking part 30. Locking part 30 can then return to the locking position. In a repeated unlocking process, the locking part 30 snaps upward again, and in this way entrains the spring clamp 50 with re-formation of the clamping gap for the locking part 30, so that then it is blocked again in its unlocked position and cannot be pivoted back unintentionally into the locking position.

The unlocking means according to the invention can be used for a plurality of applications. Instead of a control part 10 in the form of a double-spring clamp arrangement 40, a single spring (not shown) can be used. Other technical components such as, for example, parts of a roll bar system can be held by the claw or jaw opening 36 of the locking part 30 so that in this respect the range of application can be expanded at will.

The solution according to the invention is characterized especially by the fact that operation is controlled by a single lever in the form of the pivoting lever 34.

While one embodiment has been chosen to illustrate the invention, it will be understood by those skilled in the art that various changes and modifications can be made therein without departing from the scope of the invention as defined in the appended claims.

What is claimed is:
1. An unlocking device, comprising:
   a control part releasably in a locked state and movable along an unlocking path when released;
   an actuating magnet in at least one of a coil base and housing part thereof;

an actuating element movable between a locking position and an actuating position;

a control unit movable along a pivoting path between a locked position and a release position, said control unit being retained in the locked position by said actuating element in the locking position thereof and released for movement along the pivoting path to the release position when said actuating element is in the actuating position thereof, said control unit having a locking part engaging and retaining said control part in the locked state thereof when said control unit is in the locked position thereof and releasing said control part for movement along the unlocking path when said control unit is in the release position thereof, said locking part being guided on said housing part; and a blocking part holding said locking part to retain said control unit when moved with said control unit by said control part in the release position thereof and preventing unwanted re-locking of said control part, said blocking part having a spring clamp with free spring ends at least partially movable on said housing part between a blocking position in which said locking part is held by said spring clamp to retain said control unit in the release position thereof and an unblocking position in which said locking part is released to allow said control unit to move to the locked position thereof and to lock the control part in the locked state thereof, said free spring ends in the blocking position form a clamping gap therebetween receiving and clamping said locking part in the release position of said control unit.

2. An unlocking device according to claim 1 wherein said housing part comprises oblique guides forming control surfaces of said spring ends that spread said spring ends apart from one another and widen said clamping gap to release said locking part and to allow return of said control unit to the locked position thereof for locking said control part in the locked state thereof when the blocking part is moved out of the blocking position thereof.

\* \* \* \* \*

UNITED STATES PATENT AND TRADEMARK OFFICE
CERTIFICATE OF CORRECTION

| | | |
|---|---|---|
| PATENT NO. | : 8,109,544 B2 | |
| APPLICATION NO. | : 12/084323 | |
| DATED | : February 7, 2012 | |
| INVENTOR(S) | : Heinz Jacobus and Alexander Weingardt | |

It is certified that error appears in the above-identified patent and that said Letters Patent is hereby corrected as shown below:

On the title page:

Item "(73) Assignee:    Hydac Electronics GmbH" should read

Item --(73) Assignee:    Hydac Electronic GmbH--.

Signed and Sealed this
Eighth Day of May, 2012

David J. Kappos
*Director of the United States Patent and Trademark Office*